United States Patent
Wang et al.

(10) Patent No.: US 11,056,076 B2
(45) Date of Patent: Jul. 6, 2021

(54) METHOD FOR CONTROLLING SCREEN BACKLIGHT AND TERMINAL

(71) Applicant: GUANGDONG OPPO MOBILE TELECOMMUNICATIONS CORP., LTD., Guangdong (CN)

(72) Inventors: Jian Wang, Guangdong (CN); Zongjun Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 18 days.

(21) Appl. No.: 16/566,485

(22) Filed: Sep. 10, 2019

(65) Prior Publication Data
US 2020/0005732 A1    Jan. 2, 2020

Related U.S. Application Data

(63) Continuation of application No. PCT/CN2017/103225, filed on Sep. 25, 2017.

(30) Foreign Application Priority Data

Mar. 15, 2017    (CN) .......................... 201710154268.4

(51) Int. Cl.
  *G09G 5/10*      (2006.01)
  *G06K 9/00*      (2006.01)
  (Continued)

(52) U.S. Cl.
  CPC ............ *G09G 5/10* (2013.01); *G06F 9/4411* (2013.01); *G06F 9/4418* (2013.01);
  (Continued)

(58) Field of Classification Search
  None
  See application file for complete search history.

(56) References Cited

U.S. PATENT DOCUMENTS

2010/0248791 A1    9/2010   Lu
2015/0324569 A1*  11/2015   Hong ...................... G06F 21/32
                                                        345/174
(Continued)

FOREIGN PATENT DOCUMENTS

CN    102221873    10/2011
CN    102999155     3/2013
(Continued)

OTHER PUBLICATIONS

WIPO, ISR for PCT/2017/103225, Nov. 24, 2017.
(Continued)

*Primary Examiner* — Yi Wang
(74) *Attorney, Agent, or Firm* — Hodgson Russ LLP (57) ABSTRACT

A method for controlling a screen backlight and a terminal are provided. The method includes the following. When a system wake-up event is detected via system wake-up meta service of the terminal, whether a TouchDown event exists is detected via FingerService of the terminal, where the TouchDown event is generated when a touch operation on a fingerprint sensor is detected. When the TouchDown event is detected via the FingerService, whether the screen backlight is lit up is detected upon elapse of a preset period, where the preset period is longer than duration of fingerprint unlocking processing performed in response to the Touch-Down event by the terminal. When it is detected that the screen backlight is lit up, the system wake-up event is discarded.

16 Claims, 4 Drawing Sheets

(51) Int. Cl.
  *G06F 9/4401* (2018.01)
  *H04M 1/72454* (2021.01)
  *G06F 21/32* (2013.01)

(52) U.S. Cl.
  CPC ..... *G06K 9/00013* (2013.01); *G06K 9/00087* (2013.01); *H04M 1/72454* (2021.01); *G06F 21/32* (2013.01); *G09G 2320/0626* (2013.01); *G09G 2354/00* (2013.01)

(56) References Cited

U.S. PATENT DOCUMENTS

| | | | |
|---|---|---|---|
| 2017/0031542 A1 | 2/2017 | Ryu et al. | |
| 2017/0286660 A1* | 10/2017 | Li | G06K 9/00912 |
| 2019/0220647 A1* | 7/2019 | Han | H04L 63/105 |

FOREIGN PATENT DOCUMENTS

| | | | | |
|---|---|---|---|---|
| CN | 104102534 | 10/2014 | | |
| CN | 105303090 | 2/2016 | | |
| CN | 105353965 | 2/2016 | | |
| CN | 105740689 | 7/2016 | | |
| CN | 105740690 | 7/2016 | | |
| CN | 106022061 | 10/2016 | | |
| CN | 106022073 | 10/2016 | | |
| CN | 106126998 | 11/2016 | | |
| CN | 106168881 | 11/2016 | | |
| CN | 106446656 | 2/2017 | | |
| CN | 106469058 | 3/2017 | | |
| CN | 106951761 | 7/2017 | | |
| CN | 107066264 | 8/2017 | | |
| CN | 107087053 | 8/2017 | | |
| WO | WO-2013060084 A1 * | 5/2013 | | H04M 1/67 |

OTHER PUBLICATIONS

EPO, Office Action for EP Application No. 17900544.2, dated Jul. 9, 2020.
CIPO, Second Office Action for CN Application No. 201710154268.4, dated May 22, 2019.
CIPO, First Office Action for CN Application No. 201710154268.4, dated May 11, 2019.
EPO, Office Action for EP Application No. 17900544.2, dated Nov. 15, 2019.
IPI, Office Action for IN Application No. 2019170:3E1746, dated Feb. 16, 2021.

* cited by examiner

METHOD FOR CONTROLLING SCREEN BACKLIGHT AND TERMINAL

CROSS-REFERENCE TO RELATED APPLICATIONS

This application is a continuation of International Application No. PCT/CN2017/103225, filed on Sep. 25, 2017, which claims priority to Chinese Patent Application No. 201710154268.4, filed on Mar. 15, 2017, the entire disclosures of which are incorporated herein by reference.

TECHNICAL FIELD

This disclosure relates to the technical field of terminals, and particularly to a method for controlling a screen backlight and a terminal.

BACKGROUND

With the rapid development of smart phones, the smart phones can run an increasing number of applications and have powerful functions. A fingerprint sensor has become a standard configuration of the smart phones. A fingerprint unlocking function has already become a basic function of the mobile phones. Fingerprint unlocking can be used for screen unlocking, file/program encryption, mobile payment, and the like. When the fingerprint unlocking is widely used, high fingerprint unlocking performance is accordingly required.

SUMMARY

Implementations of the present disclosure provide a method for controlling a screen backlight and a terminal.

According to a first aspect of the present disclosure, a method for controlling a screen backlight of a terminal is provided. The method includes the following. When a system wake-up event is detected via system wake-up meta service of the terminal, whether a TouchDown event exists is detected via FingerService of the terminal, where the TouchDown event is generated in response to a touch operation on a fingerprint sensor of the terminal. When the TouchDown event is detected via the FingerService, whether the screen backlight is lit up is detected upon elapse of a preset period, where the preset period is longer than duration of fingerprint unlocking processing performed in response to the TouchDown event by the terminal. When the screen backlight is lit up, the system wake-up event is discarded.

According to a second aspect of the present disclosure, a terminal is provided. The terminal includes a processor and a memory. The memory is configured to store one or more programs. The one or more programs, when executed, are operable with the processor to perform the following. When a system wake-up event is detected via system wake-up meta service of the terminal, whether a TouchDown event exists is detected via FingerService of the terminal, where the TouchDown event is generated in response to a touch operation on a fingerprint sensor of the terminal. When the TouchDown event is detected via the FingerService, whether the screen backlight is lit up is detected upon elapse of a preset period, where the preset period is longer than duration of fingerprint unlocking processing performed in response to the TouchDown event by the terminal. When the screen backlight is lit up, the system wake-up event is discarded.

According to a third aspect of the present disclosure, a non-transitory computer readable storage medium is provided. The storage medium is configured to store one or more computer programs. The one or more programs, when executed, are operable with a processor to perform the following. When a system wake-up event is detected via system wake-up meta service of a terminal, whether a TouchDown event exists is detected via FingerService of the terminal, where the TouchDown event is generated in response to a touch operation on a fingerprint sensor of the terminal. When the TouchDown event is detected via the FingerService, whether the screen backlight is lit up is detected upon elapse of a preset period, where the preset period is longer than duration of fingerprint unlocking processing performed in response to the TouchDown event by the terminal. When the screen backlight is lit up, the system wake-up event is discarded.

BRIEF DESCRIPTION OF THE DRAWINGS

To describe technical solutions of implementations of the present disclosure or the related art more clearly, the following will give a brief description of accompanying drawings used for describing the implementations of the present disclosure or the related art. Apparently, the accompanying drawings described in the following are merely some implementations of the present disclosure. Those of ordinary skill in the art can also obtain other accompanying drawings based on the accompanying drawings without creative efforts.

DETAILED DESCRIPTION

In order to enable those skilled in the art to better understand technical solutions of the present disclosure, the technical solutions embodied in implementations of the present disclosure will be described in a clear and comprehensive manner in conjunction with the accompanying drawings. It is apparent that the implementations described herein are merely some of rather than all the implementations of the present disclosure. Based on the implementations of the present disclosure, all other implementations obtained by those of ordinary skill in the art without creative efforts shall fall within the protection scope of the present disclosure.

The terms "first", "second", and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or characteristics described in conjunction with the implementations may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

Terminals involved in the implementations of the present disclosure may include various handheld devices, in-vehicle devices, wearable devices, computing devices that have wireless communication functions, or other processing devices coupled to a wireless modem, as well as various forms of user equipment (UE), mobile stations (MS), terminal devices, and the like. For simplifying description, the devices mentioned above are collectively referred to as the terminals.

The following will describe the implementations of the present disclosure in detail.

From touching a fingerprint sensor by a finger to completion of fingerprint recognition, fingerprint unlocking can be divided into three phases: fingerprint collection, image matching, and interface display. Time taken for fingerprint unlocking includes total time taken for the three phases, i.e., total time taken for successful unlocking. The time is an important indicator for indicating fingerprint unlocking performance. For a solution for speeding up fingerprint recognition processing, a lock interface transparency operation is performed to display a transparent lock interface. In such a way, fingerprint data verification is visually speeded up when the fingerprint data verification succeeds. However, for unsuccessful fingerprint data matching, a lock interface transparency back operation needs to be performed to display a non-transparent lock interface. If the lock interface transparency back operation is not completed at the moment of lighting up the screen, the terminal continues to perform the lock interface transparency back operation after lighting up the screen, and this operation can cause splash screen or white screen.

For terminals having the fingerprint sensor, to speed up fingerprint unlocking in screen-off status, a person of ordinary skill in the art understands that when the fingerprint sensor is touched by part of a user's finger containing fingerprint, a system wake-up operation and a lock screen transparency operation are performed in parallel. After the system is waken up, fingerprint data collected by the fingerprint sensor is recognized via an application processor (AP) to generate a matching result. When the matching result indicates an unsuccessful matching, the lock interface transparency back operation needs to be performed to display the non-transparent unlock interface. For unsuccessful fingerprint unlocking, a lot of time may be consumed. Lighting up the screen backlight in response to the system wake-up event takes less time. If lighting up the screen backlight is performed before completion of the unsuccessful fingerprint unlocking, the splash screen is generated.

In implementations of the present disclosure, when a system wake-up event is detected via system wake-up meta service, the terminal detects whether there is a TouchDown event via FingerService of the terminal. When the TouchDown event is detected via the FingerService, whether the screen backlight is lit up is detected upon elapse of a preset period. When it is detected that the screen backlight is lit up, the system wake-up event is discarded. When it is detected that the screen backlight is not lit up, the LightService is controlled to light up the screen backlight. The preset period is set to be longer than duration of fingerprint unlocking processing performed in response to the TouchDown event by the terminal. The fingerprint unlocking processing includes a processing for unsuccessful fingerprint unlocking. The processing for unsuccessful fingerprint unlocking includes an operation of changing the lock interface from transparency to opacity. With the delay of the preset period, the screen backlight is lit up only after the lock interface is changed from transparency to opacity, thereby avoiding the splash screen, and increasing system stability.

According to a first aspect of the present disclosure, a method for controlling a screen backlight of a terminal is provided. The method includes the following. When a system wake-up event is detected via system wake-up meta service of the terminal, whether a TouchDown event exists is detected via FingerService of the terminal, where the TouchDown event is generated in response to a touch operation on a fingerprint sensor of the terminal. When the TouchDown event is detected via the FingerService, whether the screen backlight is lit up is detected upon elapse of a preset period, where the preset period is longer than duration of fingerprint unlocking processing performed in response to the TouchDown event by the terminal. When the screen backlight is lit up, the system wake-up event is discarded.

According to a second aspect of the present disclosure, a terminal is provided. The terminal includes a processor and a memory. The memory is configured to store one or more programs. The one or more programs, when executed, are operable with the processor to perform the following. When a system wake-up event is detected via system wake-up meta service of the terminal, whether a TouchDown event exists is detected via FingerService of the terminal, where the TouchDown event is generated in response to a touch operation on a fingerprint sensor of the terminal. When the TouchDown event is detected via the FingerService, whether the screen backlight is lit up is detected upon elapse of a preset period, where the preset period is longer than duration of fingerprint unlocking processing performed in response to the TouchDown event by the terminal. When the screen backlight is lit up, the system wake-up event is discarded.

According to a third aspect of the present disclosure, a non-transitory computer readable storage medium is provided. The storage medium is configured to store one or more computer programs. The one or more programs, when executed, are operable with a processor to perform the following. When a system wake-up event is detected via system wake-up meta service of the terminal, whether a TouchDown event exists is detected via FingerService of a terminal, where the TouchDown event is generated in response to a touch operation on a fingerprint sensor of the terminal. When the TouchDown event is detected via the FingerService, whether the screen backlight is lit up is detected upon elapse of a preset period, where the preset period is longer than duration of fingerprint unlocking processing performed in response to the TouchDown event by the terminal. When the screen backlight is lit up, the system wake-up event is discarded.

In the implementation, with the delay of the preset period, the screen backlight is lit up after the fingerprint unlocking processing, thereby avoiding splash screen, and improving system stability.

Figure 1:
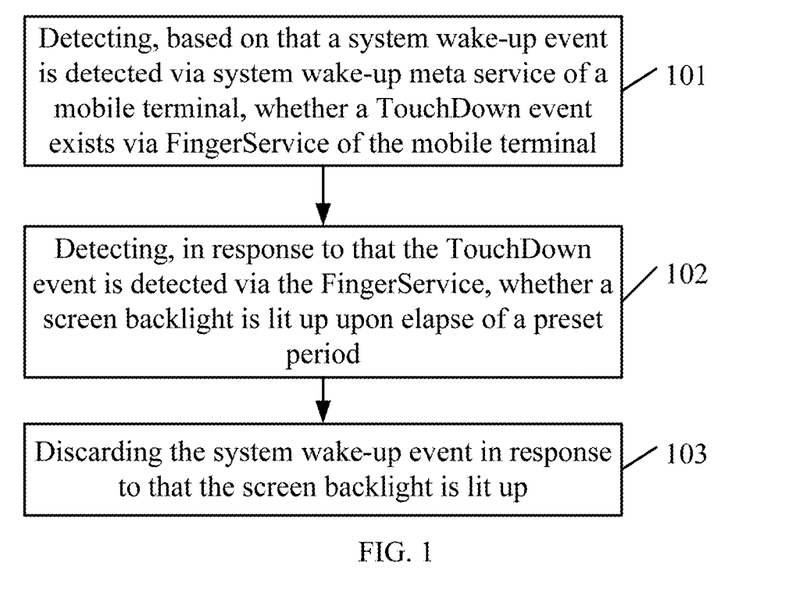
FIG. 1 is a flow chart illustrating a method for controlling a screen backlight according to an implementation of the present disclosure.

FIG. 1 is a flow chart illustrating a method for controlling a screen backlight according to an implementation of the present disclosure. The method is applied to a terminal. The terminal includes a fingerprint sensor. As illustrated in FIG. 1, the method for controlling the screen backlight includes the following.

At block 101, when a system wake-up event is detected via system wake-up meta service of the terminal, the terminal detects whether a TouchDown event exists via FingerService of the terminal, where the TouchDown event is generated in response to a touch operation on the fingerprint sensor.

The terminal is in screen-off status. The fingerprint sensor is a hardware component including the fingerprint sensor and a physical button such as a Home button. The fingerprint sensor may be associated with functions of the terminal such as a fingerprint recognition function, a desktop back function, a function of lighting up the screen backlight and so on.

The system wake-up meta event may be a power switch wake-up meta event, an incoming call prompt wake-up meta event, or a short message wake-up meta event for example.

The touch operation on the fingerprint sensor is a touch operation of touching the fingerprint sensor by part of a user's finger containing fingerprint. The TouchDown event is detected as follows. Reference parameters of N sampling points collected by the fingerprint sensor at the current time are obtained. When a matching degree between a reference image and a preset fingerprint image is larger than or equal to a preset matching degree threshold, it is determined that the TouchDown event is detected, where the reference image is formed with the reference parameters of the N sampling points, and N is a positive integer. The reference parameters may be capacitive parameters (corresponding to a capacitive fingerprint sensor), voltage parameters or current parameters (corresponding to an optical fingerprint sensor) for example. The preset matching degree threshold may be an experience value for initially touching the fingerprint sensor by the part of the user's finger containing fingerprint. In such a way, a case that the TouchDown event is triggered in response to touching the fingerprint sensor by a fingernail of the user's finger can be avoided, thereby improving recognition accuracy and system stability.

At block 102, when the TouchDown event is detected via the FingerService, the terminal detects whether the screen backlight is lit up upon elapse of a preset period, where the preset period is longer than duration of fingerprint unlocking processing performed in response to the TouchDown event by the terminal.

The fingerprint unlocking processing includes a processing for successful fingerprint unlocking and a processing for unsuccessful fingerprint unlocking. The processing for successful fingerprint unlocking includes changing a lock interface from opacity to transparency, collecting fingerprint data, matching the fingerprint data, matching successfully, removing the lock interface, and lighting up the screen backlight. The processing for unsuccessful fingerprint unlocking includes changing the lock interface from opacity to transparency, collecting fingerprint data, matching the fingerprint data, matching unsuccessfully, changing the lock interface from transparency to opacity, and lighting up the screen backlight.

At block 103, when it is detected that the screen backlight is lit up, the terminal discards the system wake-up event.

It can be seen that in the implementation of the present disclosure, when the system wake-up event is detected via the system wake-up meta service, the terminal detects whether the TouchDown event exists via the FingerService of the terminal. When the TouchDown event is detected via the FingerService, whether the screen backlight is lit up is detected upon elapse of the preset period. When it is detected that the screen backlight is lit up, the system wake-up event is discarded. When it is detected that the screen backlight is not lit up, LightService is controlled to light up the screen backlight. The preset period is longer than the the duration of the fingerprint unlocking processing performed in response to the TouchDown event by the terminal. The fingerprint unlocking processing includes the processing for unsuccessful fingerprint unlocking. The processing for unsuccessful fingerprint unlocking includes the operation of changing the lock interface from transparency to opacity. With the delay of the preset period, the screen backlight is lit up after changing the lock interface from transparency to opacity, thereby avoiding splash screen, and improving system stability.

In a possible example, the method further includes the following. When the terminal detects that there is no TouchDown event via the FingerService, the terminal controls, via lock screen service (Keyguard), interface rendering service (SurfaceFlinger) to display the lock interface, and controls the LightService to light up the screen backlight, where the lock interface is non-transparent.

In a possible example, after the system wake-up event is detected via the system wake-up meta service of the terminal, the method further includes the following. When the TouchDown event is detected, fingerprint data is obtained. When it is detected that the fingerprint data is successfully matched, the Keyguard is controlled to remove the lock screen and display a preset interface.

In a possible example, the method further includes the following. When the TouchDown event is detected, a first operation and a second operation are performed in parallel. The first operation is an operation of waking up a system via power. The second operation is an operation of performing a first transparency processing on the lock interface, where the lock interface subjected to the first transparency processing is transparent.

When it is detected that fingerprint data collected by the fingerprint sensor is unsuccessfully matched, a third operation and a fourth operation are performed in parallel. The third operation is an operation of performing a second transparency processing on the lock interface, where the lock interface subjected to the second transparency processing is non-transparent. The fourth operation is an operation of detecting whether the second transparency processing has been completed, and controlling the LightService to light up the screen backlight when it is detected that the second transparency processing has been completed and the screen backlight is not lit up.

It can be seen that in this example, when the TouchDown event is detected via the terminal, the terminal performs the first operation and the second operation in parallel. When it is detected that the fingerprint data collected by the fingerprint sensor is unsuccessfully matched, the third operation and the fourth operation are performed in parallel, and thus the splash screen is avoided while increasing the speed of lighting up the screen backlight.

In a possible example, the second transparency processing is performed on the lock interface as follows. A fifth operation and a sixth operation are performed in parallel. The fifth operation is an operation of controlling, via the FingerService, the SurfaceFlinger to update a first parameter of the lock interface, and controlling, via the FingerService, the SurfaceFlinger to display the lock interface updated. The sixth operation is an operation of controlling, via the FingerprintService, the Keyguard to update a second parameter of the lock interface in the FrameWork layer. The first parameter and the second parameter are different parameters for indicating different transparency of the lock interface, such as alpha parameters.

Whether the second transparency processing has been completed is detected as follows. Whether the first parameter of the lock interface has been updated is detected.

It can be seen that in this example, since the time taken for the second transparency processing is further reduced, the lock interface can be quickly changed from transparency to opacity. The screen backlight is lit up after the lock interface is successfully changed from transparency to opacity, and thus a time point at which the screen backlight is lit up is advanced, thereby avoiding the splash screen.

In a possible example, the method further includes the following. When the terminal detects that the screen backlight is not lit up, the terminal lights up the screen backlight via the LightService.

It can be seen that in this example, when the terminal detects that the screen backlight is not lit up, the terminal lights up the screen backlight via the LightService, and thus the system can light up the screen backlight in time under a condition that the screen backlight is not lit up during the fingerprint unlocking processing, thereby ensuring accurate response for the system wake-up event, and improving system stability.

Figure 2:
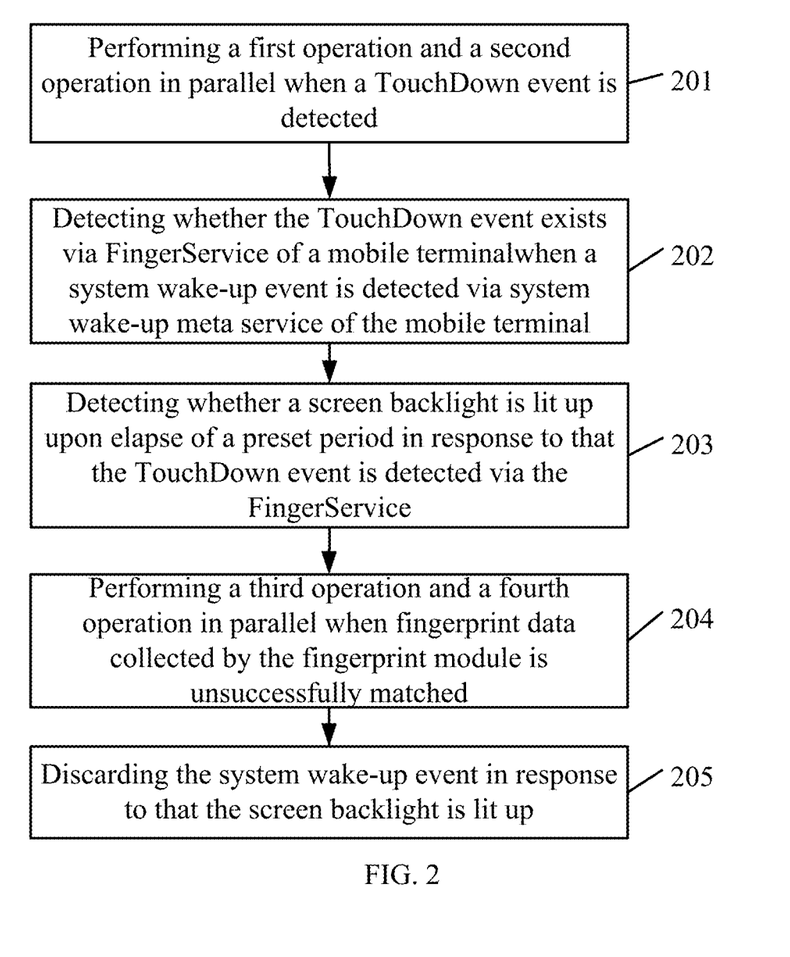
FIG. 2 is a flow chart illustrating a method for controlling a screen backlight according to another implementation of the present disclosure.

In consistence with the implementation illustrated in FIG. 1, FIG. 2 is a flow chart illustrating a method for controlling a screen backlight according to another implementation of the present disclosure. The method is applied to a terminal. The terminal includes a fingerprint sensor. As illustrated in FIG. 2, the method for controlling the screen backlight includes the following.

At block 201, when a TouchDown event is detected, the terminal performs a first operation and a second operation in parallel, where the first operation is an operation of waking up a system via power, the second operation is an operation of performing a first transparency processing on a lock interface, and the lock interface subjected to the first transparency processing is transparent.

At block 202, when a system wake-up event is detected via system wake-up meta service of the terminal, the terminal detects whether the TouchDown event exists via FingerService of the terminal, where the TouchDown event is generated in response to a touch operation on the fingerprint sensor.

At block 203, in response to that the TouchDown event is detected via the FingerService, the terminal detects whether the screen backlight is lit up upon elapse of a preset period, where the preset period is longer than duration of fingerprint unlocking processing performed in response to the TouchDown event by the terminal.

At block 204, when fingerprint data collected by the fingerprint sensor is unsuccessfully matched, the terminal performs a third operation and a fourth operation in parallel, where the third operation is an operation of performing a second transparency processing on the lock interface, the lock interface subjected to the second transparency processing is opaque, the fourth operation is an operation of detecting whether the second transparency processing has been completed, and controlling LightService to light up the screen backlight based on that the second transparency processing has been completed and the screen backlight is not lit up.

The operation at block 204 may be performed after the operation at block 203, and also may be performed before the operation at block 202 and the operation at block 203, and the present disclosure is not limited thereto.

At block 205, when it is detected that the screen backlight is lit up, the terminal discards the system wake-up event.

It can be seen that in the implementation of the present disclosure, when the system wake-up event is detected via the system wake-up meta service, the terminal detects whether the TouchDown event exists via the FingerService of the terminal. When the TouchDown event is detected via the FingerService, whether the screen backlight is lit up is detected upon elapse of the preset period. When it is detected that the screen backlight is lit up, the system wake-up event is discarded. When it is detected that the screen backlight is not lit up, the LightService is controlled to light up the screen backlight. The preset period is longer than the duration of the fingerprint unlocking processing performed in response to the TouchDown event by the terminal. The fingerprint unlocking processing includes the processing for unsuccessful fingerprint unlocking. The processing for unsuccessful fingerprint unlocking includes the operation of changing the lock interface from transparency to opacity. With the delay of the preset period, the screen backlight is lit up after changing the lock interface from transparency to opacity, thereby avoiding splash screen, and improving system stability.

The foregoing implementations mainly introduces the solution of the implementation of the present disclosure from the perspective of the method process. It can be understood that the terminal includes corresponding hardware structures and/or software modules for performing respective functions to implement the above functions. Those skilled in the art readily appreciate that the present disclosure can be implemented in hardware or a combination of hardware and computer software according to the elements and algorithms of the various examples described in the implementations disclosed herein. Whether a function is implemented in hardware or a manner of driving hardware by computer software depends on the specific application and design constraints of the solution. A person skilled in the art can use different methods for each particular application to implement the described functions, but such realization should not be considered to be beyond the scope of the present disclosure.

In the implementations of the present disclosure, the terminal can be divided into functional units according to the method implementations. For example, the terminal can be divided into functional units according to various functions, or two or more functions may be integrated into one processing unit. The integrated unit can be implemented in the form of hardware or in the form of a software functional unit. What needs to be illustrated is that the division of the units in the implementation of the present disclosure is illustrative and only a logical function division, and there can be other division manners in actual implementations.

Figure 3:
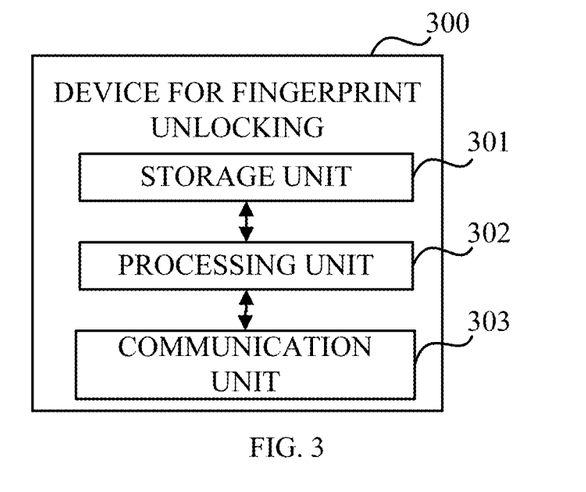
FIG. 3 is a block diagram illustrating a terminal according to an implementation of the present disclosure.

In this condition that the integrated unit is employed, FIG. 3 is a block diagram illustrating a terminal according to an implementation of the present disclosure. The terminal 300 includes a processing unit 302 and a communication unit 303. The processing unit 302 is configured to control and manage operations of the terminal. For example, the processing unit 302 can perform the operations at blocks 101 to 103 illustrated in FIG. 1, the operations at blocks 201 to 205 illustrated in FIG. 2, and other processes of technology described in the present disclosure. The terminal further includes a storage unit 301 configured to store program codes and data of the terminal.

The processing unit 302 may be a processor or a controller, for example, a central processing unit (CPU), a general processor, a digital signal processor (DSP), an application-specific integrated circuit (ASIC), a field programmable gate array (FPGA), or other programmable logic device, a transistor logic device, a hardware component, or any combination thereof. The processor can implement or execute various exemplary logic blocks, modules, and circuits described in combination with contents of the present disclosure. The processor may be a combination for realizing computing functions, for example, include one or more microprocessor combinations, a combination of the DSP and the microprocessor, and the like. The communication unit 303 may be a communication interface, a transceiver, a transceiver circuit, and the like. The communication interface is a joint name, and may include one or more interfaces. The storage unit 301 may be a memory.

The processing unit 302 is configured to detect, based on that a system wake-up event is detected via system wake-up meta service of the terminal, whether a TouchDown event exists via FingerService of the terminal, where the Touch-Down event is generated in response to a touch operation on a fingerprint sensor. The processing unit 302 is further configured to detect, in response to that the TouchDown event is detected via the FingerService, whether the screen backlight is lit up upon elapse of a preset period, where the preset period is longer than duration of fingerprint unlocking processing performed in response to the TouchDown event by the terminal. The processing unit 302 is further configured to discard the system wake-up event in response to that the screen backlight is lit up.

In a possible example, the processing unit 302 is further configured to control, via Keyguard, SurfaceFlinger to display a lock interface in response to that no TouchDown event is detected via the FingerService, and control, via the Keyguard, LightService to light up the screen backlight, where the lock interface is opaque.

In a possible example, the processing unit 302 is further configured to obtain, in response to the TouchDown event, fingerprint data, and control, in response to that the fingerprint data is successfully matched, the Keyguard to remove the lock interface and display a preset interface.

In a possible example, the processing unit 302 is further configured to perform, in response to the TouchDown event, a first operation and a second operation in parallel, where the first operation is an operation of waking up a system via power, the second operation is an operation of performing a first transparency processing on the lock interface, and the lock interface subjected to the first transparency processing is transparent. The processing unit 302 is further configured to perform, based on that the fingerprint data collected by the fingerprint sensor is unsuccessfully matched, a third operation and a fourth operation in parallel, where the third operation is an operation of performing a second transparency processing on the lock interface, the lock interface subjected to the second transparency processing is opaque, the fourth operation is an operation of detecting whether the second transparency processing has been completed, and controlling the LightService to light up the screen backlight based on that the second transparency processing has been completed and the screen backlight is not lit up.

In a possible example, the processing unit 302 configured to perform the second transparency processing on the lock interface is configured to perform a fifth operation and a sixth operation in parallel, where the fifth operation is an operation of controlling, via the FingerService, the Surface-Flinger to update a first parameter of the lock interface, and controlling, via the FingerService, the SurfaceFlinger to display the lock interface updated, the sixth operation is an operation of controlling, via the FingerprintService, the Keyguard to update a second parameter of the lock interface in a framework layer. The first parameters and the second parameters are different parameters for indicating different transparency of the lock interface.

The processing unit 302 configured to detect whether the second transparency processing has been completed is configured to detect whether the first layer parameter of the lock interface has been updated.

Figure 4:
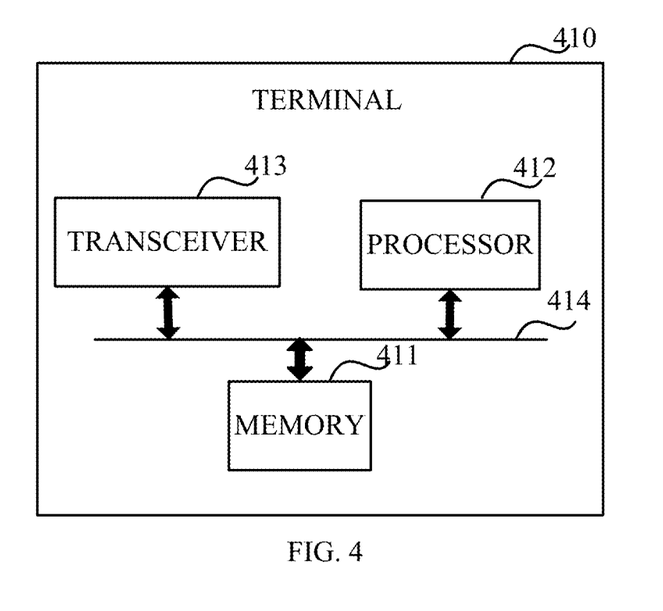
FIG. 4 is a block diagram illustrating a terminal according to another implementation of the present disclosure.

When the processing unit 302 is the processor, the communication unit 303 is the communication interface, and the storage unit 301 is the memory, then the terminal involved in the implementation of the present disclosure may be a terminal illustrated in FIG. 4.

Referring to FIG. 4, a terminal 410 includes a processor 412, a transceiver 413, and a memory 411. The terminal 410 may further include a bus 414. The processor 412 is coupled with the transceiver 413 and the memory 411 via the bus 414. The bus 414 may be a peripheral component interconnect (PCI) bus, an extended industry standard architecture (EISA) bus, or the like. The bus 414 may be an address bus, a data bus, a control bus, and so on. For simple illustration, in FIG. 3B, the bus 414 is indicated only by a thick line, but it does not indicate that only one bus or only one type of buses are included.

Figure 5:
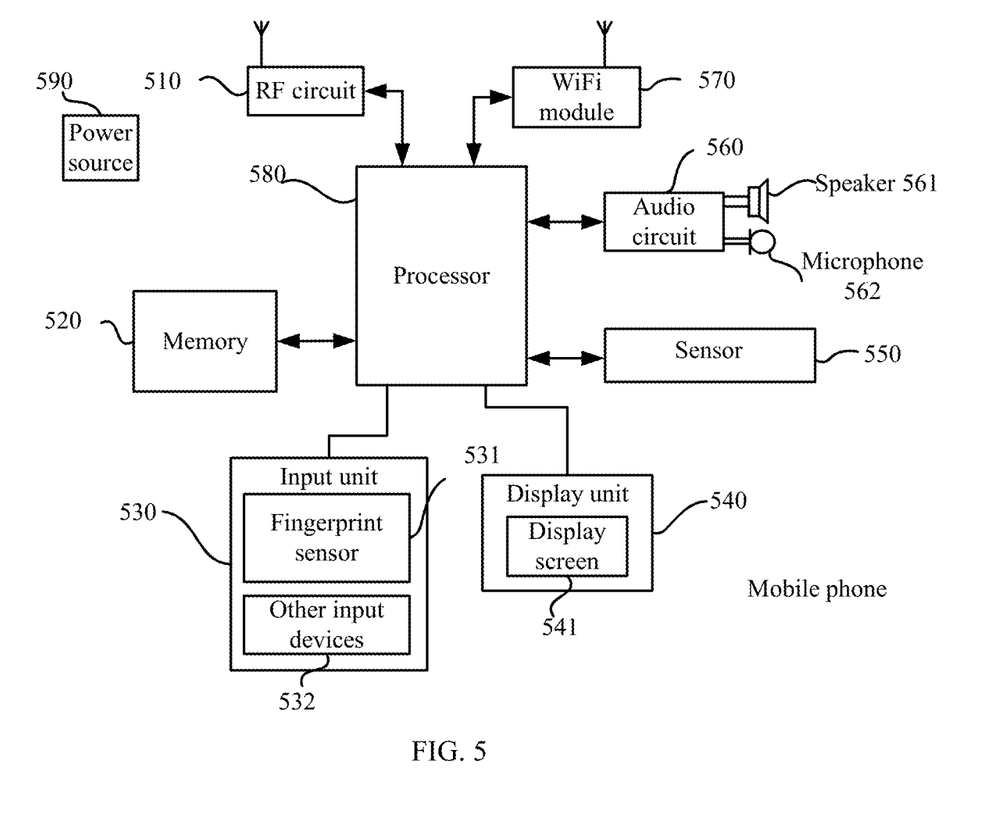
FIG. 5 is a block diagram illustrating a terminal according to yet another implementation of the present disclosure.

Implementations of the present disclosure further provides another terminal. As illustrated in FIG. 5, for simple illustration, only parts related to the implementations of the present disclosure are illustrated, and details are not disclosed. For details, reference may be made to the method implementations of the present disclosure. The terminal may be a mobile phone, a tablet computer, a personal digital assistant (PDA), a point of sales (POS), an on-board computer, or the like. The following describes a mobile phone as an example of the terminal.

FIG. 5 is a block diagram illustrating a part of a structure of a mobile phone related to a terminal according to an implementation of the present disclosure. With reference to FIG. 5, the mobile phone may include a radio frequency (RF) circuit 510, a memory 520, an input unit 530, a display unit 540, a sensor 550, an audio circuit 560, a wireless fidelity (Wi-Fi) module 570, a processor 580, a power supply 590, and so on. Those skilled in the art can understand that the structure of the mobile phone illustrated in FIG. 5 does not constitute any limitation on a mobile phone. The mobile phone may include more or fewer components than illustrated, some components may be combined, or the mobile phone may include different component arrangements.

The following will specifically illustrate various components of the mobile phone in combination with FIG. 5.

The RF circuit 510 is configured to receive and transmit information. Generally, the RF circuit 510 includes, but is not limited to, an antenna, at least one amplifier, a transceiver, a coupler, a low noise amplifier (LNA), a duplexer and the like. In addition, the RF circuit 510 may also communicate with network and other devices by wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 520 is configured to store software programs and modules. The processor 580 is configured to execute various function applications and data processing for the mobile phone by running the software programs and the modules stored in the memory 520. The memory 520 mainly includes a program storage area and a data storage area. The program storage area may store an operating system, application programs required for at least one function and so on. The data storage area may store data created according to use of the mobile phone, and so on. In addition, the memory 520 may include a high-speed RAM, and may further include a non-volatile memory such as at least one disk storage device, a flash device, or other non-volatile solid storage devices.

The input unit 530 may be configured to receive input digital or character information and generate key signal input associated with user setting and function control of the mobile phone. In an implementation, the input unit 530 may include a fingerprint sensor 531 and other input devices 532. The fingerprint sensor 531 can collect data of fingerprint of a user thereon. In addition to the fingerprint sensor 531, the input unit 530 may further include other input devices 532. In an implementation, the other input devices 532 may include, but is not limited to, one or more of a touch screen, a physical keyboard, function keys (such as volume control buttons, switch buttons and so on), a trackball, a mouse, and a joystick.

The display unit 540 is configured to display information input by the user or information provided for the user or various menus of the mobile phone. The display unit 540 may include a display screen 541, and alternatively, the display screen 541 may be in the form of a liquid crystal display (LCD), an organic light-emitting diode (OLED) and so on. Although in FIG. 5, the fingerprint sensor 531 and the display screen 541 are used as two separate components to realize input and output functions of the terminal, in some implementations, the fingerprint sensor 531 may be integrated with the display screen 541 to realize the input and playback functions of the mobile phone.

The mobile phone may also include at least one sensor 550, such as a light sensor, a motion sensor, and other sensors. In an implementation, the light sensor may include an ambient light sensor and a proximity sensor. The ambient light sensor may adjust the brightness of the display screen 541 according to the brightness of ambient lights. The proximity sensor may turn off the display screen 541 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity. The accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, an infrared sensor and other sensors, which will not be repeated herein.

The audio circuit 560, the speaker 561, the microphone 562 may provide an audio interface between the user and the mobile phone. The audio circuit 560 may convert the received audio data into electrical signals and transfer the electrical signals to the speaker 561; thereafter the speaker 561 converts the electrical signals into sound signals to output. On the other hand, the microphone 562 converts the received sound signals into electrical signals, which will be received and converted into audio data by the audio circuit 560 to output. The audio data is then processed and transmitted by the processor 580 via the RF circuit 510 to another mobile phone for example, or, the audio data is output to the memory 520 for further processing.

Wi-Fi belongs to a short-distance wireless transmission technology. With aid of the Wi-Fi module 570, the mobile phone may assist the user in E-mail receiving and sending, webpage browsing, access to streaming media and the like. Wi-Fi provides users with wireless broadband Internet access. Although the Wi-Fi module 570 is illustrated in FIG. 5, the Wi-Fi module 570 is not essential to the mobile phone and can be omitted according to actual needs without departing from the essential nature of the present disclosure.

The processor 580 is the control center of the mobile phone. The processor 580 connects various parts of the whole mobile phone through various interfaces and lines, runs or executes software programs and/or modules stored in the memory 520, and invokes data stored in the memory 520 to perform various functions of the mobile phone and process data, thereby monitoring the mobile phone as a whole. Optionally, the processor 580 may include one or more processing units. For example, for the processor 580, an application processor may be integrated with a modem processor, where the application processor handles the operating system, the user interface, the application, and so on, and the modem processor mainly processes wireless communication. It can be understood that the above-mentioned modem processor may not be integrated into the processor 580.

The mobile phone may also include the power supply 590 (e.g., a battery) that supplies power to various components. Preferably, the power supply may be logically connected to the processor 580 via a power management system to enable management of charging, discharging, and power consumption through the power management system.

Although not illustrated, the mobile phone may further include a camera, a Bluetooth module, and so on, and details are not repeated herein.

In the above embodiments illustrated in FIG. 1 and FIG. 2, method processes in various steps may be realized based on the structure of the mobile phone.

For the implementation illustrated in FIG. 3, the functions of the units can be realized based on the structure of the mobile phone.

Implementations of the present disclosure also provide a computer storage medium. The computer storage medium stores computer programs. The computer programs are operable to implement a part of or all operations of any of the above methods for controlling a screen backlight recorded in the above method implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain operations may be performed in other order or simultaneously. Besides, it will be appreciated by those skilled in the art that the implementations described in the specification are exemplary embodiments and the actions and modules involved are not necessarily essential to the present disclosure.

In the foregoing implementations, the description of each implementation has its own emphasis. For the parts not described in detail in one embodiment, reference may be made to related descriptions in other implementations.

In the implementations of the disclosure, it can be understood that the apparatus disclosed in implementations provided herein may be implemented in other manners. For example, the device/apparatus implementations described above are merely illustrative; for instance, the division of the units is only a logical function division and there can be other division manners during actual implementations. For example, multiple units or components may be combined or may be integrated into another system, or some features may be ignored, omitted, or not performed. In addition, coupling or direct coupling or communication connection among illustrated or discussed components may be indirect coupling or communication connection among devices or units via some interfaces, and may be electrical connection, or other forms of connection.

The units described as separate components may or may not be physically separated. The components illustrated as units may or may not be physical units, that is, they may be in the same place or may be distributed to multiple network elements. All or part of the units may be selected according to actual needs to achieve the technical solutions of the embodiments.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions operable with a computer device (which may be a personal computer, a server, or a network device and so on) to perform all or part of the operations described in the various implementations of the present disclosure. The memory includes various medium capable of storing program codes, such as a universal serial bus (USB) flash disk, a read-only memory (ROM), a random-access memory (RAM), a movable hard disk, a disk, a compact disc (CD), and the like.

It will be understood by those ordinarily skilled in the art that all or a part of operations of the various methods of the implementations described above may be accomplished by means of a program to instruct associated hardware. The program may be stored in a computer-readable memory, which may include a flash memory, a ROM, a RAM, a disk or a CD, and so on.

The above illustrates the implementations of the present disclosure in detail. The specification employs specific examples to illustrate the principle and implementation manners of the present disclosure. The illustration of the above implementations is just used to help in understanding of the method and core concept of the present disclosure. For a person ordinarily skilled in the art, according to the concept of the present disclosure, changes may be made on the specific implementations and application range. In conclusion, the content of the specification shall not be understood to limit the present disclosure.

What is claimed is:

1. A method for controlling a screen backlight of a terminal, comprising:
   detecting, based on a system wake-up event being detected via system wake-up meta service of the terminal, whether a TouchDown event exists via FingerService of the terminal, the TouchDown event being generated in response to a touch operation on a fingerprint sensor of the terminal;
   detecting, in response to the TouchDown event being detected via the FingerService, whether the screen backlight is lit up upon elapse of a preset period, the preset period being longer than a duration of fingerprint unlocking processing performed in response to the TouchDown event by the terminal; and
   discarding the system wake-up event in response to the screen backlight being lit up;
   the method further comprising:
   performing, in response to the TouchDown event, a first operation and a second operation in parallel, the first operation being an operation of waking up a system via power, the second operation being an operation of performing a first transparency processing on a lock interface, and the lock interface subjected to the first transparency processing being transparent; and
   performing, based on fingerprint data collected by the fingerprint sensor being unsuccessfully matched, a third operation and a fourth operation in parallel, the third operation being an operation of performing a second transparency processing on the lock interface, the lock interface subjected to the second transparency processing being opaque, the fourth operation being an operation of detecting whether the second transparency processing has been completed, and controlling LightService to light up the screen backlight based on that the second transparency processing has been completed and the screen backlight is not lit up.

2. The method of claim 1, wherein detecting whether the TouchDown event exists comprises:
   obtaining reference parameters of N sampling points collected by the fingerprint sensor at current time; and
   determining, based on that a matching degree between a reference image and a preset fingerprint image is larger than or equal to a preset matching degree threshold, that the TouchDown event exists, the reference image being formed with the reference parameters of the N sampling points, and N being a positive integer.

3. The method of claim 1, wherein the system wake-up meta event comprises at least one of a power switch wake-up meta event, an incoming call prompt wake-up meta event, or a short message wake-up meta event.

4. The method of claim 1, wherein the fingerprint unlocking processing comprises a processing for successful fingerprint unlocking and a processing for unsuccessful fingerprint unlocking;
   wherein the processing for successful fingerprint unlocking further comprises changing a lock interface from opacity to transparency, collecting fingerprint data, matching the fingerprint data, matching successfully, removing the lock interface, and lighting up the screen backlight; and
   wherein the processing for unsuccessful fingerprint unlocking further comprises changing the lock interface from opacity to transparency, collecting fingerprint data, matching the fingerprint data, matching unsuccessfully, changing the lock interface from transparency to opacity, and lighting up the screen backlight.

5. The method of claim 1, further comprising:
controlling, via lock screen service (Keyguard), interface rendering service (SurfaceFlinger) to display a lock interface in response to no TouchDown event being detected via the FingerService; and
controlling, via the Keyguard, LightService to light up the screen backlight, the lock interface being opaque.

6. The method of claim 5, further comprising:
obtaining fingerprint data in response to the TouchDown event; and
controlling, in response to the fingerprint data being successfully matched, the Keyguard to remove the lock interface and display a preset interface.

7. The method of claim 1, wherein performing the second transparency processing on the lock interface comprises:
performing a fifth operation and a sixth operation in parallel, wherein the fifth operation is an operation of controlling, via the FingerService, SurfaceFlinger to update a first parameter of the lock interface, and controlling, via the FingerService, the SurfaceFlinger to display the lock interface updated, wherein the sixth operation is an operation of controlling, via the FingerService, Keyguard to update a second parameter of the lock interface in a framework layer, wherein the first parameter and the second parameter are different parameters for indicating different transparency of the lock interface;
detecting whether the second transparency processing has been completed comprises:
detecting whether the first layer parameter of the lock interface has been updated.

8. A terminal comprising:
a processor; and
a memory, configured to store one or more programs;
wherein the one or more programs, when executed by the processor, are configured to:
detect, based on a system wake-up event being detected via system wake-up meta service of the terminal, whether a TouchDown event exists via FingerService of the terminal, the TouchDown event being generated in response to a touch operation on a fingerprint sensor of the terminal;
detect, in response to the TouchDown event being detected via the FingerService, whether a screen backlight is lit up upon elapse of a preset period, the preset period being longer than duration of fingerprint unlocking processing performed in response to the TouchDown event by the terminal; and
discard the system wake-up event in response to the screen backlight being lit up;
wherein the one or more programs are further configured to:
perform, in response to the TouchDown event, a first operation and a second operation in parallel, wherein the first operation is an operation of waking up a system via power, the second operation is an operation of performing a first transparency processing on a lock interface, wherein the lock interface subjected to the first transparency processing is transparent; and
perform, based on fingerprint data collected by the fingerprint sensor being unsuccessfully matched, a third operation and a fourth operation in parallel, wherein the third operation is an operation of performing a second transparency processing on the lock interface, and the lock interface subjected to the second transparency processing is opaque, wherein the fourth operation is an operation of detecting whether the second transparency processing has been completed, and controlling LightService to light up the screen backlight based on that the second transparency processing has been completed and the screen backlight is not lit up.

9. The terminal of claim 8, wherein the one or more programs are further configured to:
obtain reference parameters of N sampling points collected by the fingerprint sensor at current time; and
determine, based on a matching degree between a reference image and a preset fingerprint image being larger than or equal to a preset matching degree threshold, that the TouchDown event exists, wherein the reference image is formed with the reference parameters of the N sampling points, and N is a positive integer.

10. The terminal of claim 8, wherein the system wake-up meta event comprises at least one of a power switch wake-up meta event, an incoming call prompt wake-up meta event, or a short message wake-up meta event.

11. The terminal of claim 8, wherein the fingerprint unlocking processing comprises a processing for successful fingerprint unlocking and a processing for unsuccessful fingerprint unlocking;
wherein the processing for successful fingerprint unlocking further comprises changing a lock interface from opacity to transparency, collecting fingerprint data, matching the fingerprint data, matching successfully, removing the lock interface, and lighting up the screen backlight; and
wherein the processing for unsuccessful fingerprint unlocking further comprises changing the lock interface from opacity to transparency, collecting fingerprint data, matching the fingerprint data, matching unsuccessfully, changing the lock interface from transparency to opacity, and lighting up the screen backlight.

12. The terminal of claim 8, wherein the one or more programs are further configured to:
control, via lock screen service (Keyguard), interface rendering service (SurfaceFlinger) to display a lock interface in response to that no TouchDown event is detected via the FingerService; and
control, via the Keyguard, LightService to light up the screen backlight, wherein the lock interface is opaque.

13. The terminal of claim 12, wherein the one or more programs are further configured to:
obtain fingerprint data in response to the TouchDown event; and
control, in response to the fingerprint data being successfully matched, the Keyguard to remove the lock interface and display a preset interface.

14. The terminal of claim 8, wherein the one or more programs operable with the processor to perform the second transparency processing on the lock interface are configured to:
perform a fifth operation and a sixth operation in parallel, wherein the fifth operation is an operation of controlling, via the FingerService, SurfaceFlinger to update a first parameter of the lock interface, and control, via the FingerService, the SurfaceFlinger to display the lock interface updated, wherein the sixth operation is an operation of controlling, via the FingerService, Keyguard to update a second parameter of the lock interface in a framework layer, wherein the first parameter and the second parameter are different parameters for indicating different transparency of the lock interface;
the one or more programs operable with the processor to detect whether the second transparency processing has been completed are configured to:
  detect whether the first parameter of the lock interface has been updated.

15. A non-transitory computer readable storage medium, being configured to store one or more programs;
wherein the one or more programs, when executed by a processor, are configured to:
  detect, based on a system wake-up event being detected via system wake-up meta service of a terminal, whether a TouchDown event exists via FingerService of the terminal, the TouchDown event being generated in response to a touch operation on a fingerprint sensor of the terminal;
  detect, in response to the TouchDown event being detected via the FingerService, whether a screen backlight is lit up upon elapse of a preset period, the preset period being longer than duration of fingerprint unlocking processing performed in response to the TouchDown event by the terminal; and
  discard the system wake-up event in response to the screen backlight being lit up;
wherein the one or more programs, when executed by the processor, are further configured to:
  perform, in response to the TouchDown event, a first operation and a second operation in parallel, wherein the first operation is an operation of waking up a system via power, the second operation is an operation of performing a first transparency processing on a lock interface, wherein the lock interface subjected to the first transparency processing is transparent; and
  perform, based on fingerprint data collected by the fingerprint sensor being unsuccessfully matched, a third operation and a fourth operation in parallel, wherein the third operation is an operation of performing a second transparency processing on the lock interface, and the lock interface subjected to the second transparency processing is opaque, wherein the fourth operation is an operation of detecting whether the second transparency processing has been completed, and controlling LightService to light up the screen backlight based on that the second transparency processing has been completed and the screen backlight is not lit up.

16. The non-transitory computer readable storage medium of claim 15, wherein the one or more programs operable with the processor to detect whether the TouchDown event exists are configured to:
  obtain reference parameters of N sampling points collected by the fingerprint sensor at current time; and
  determine, based on that a matching degree between a reference image and a preset fingerprint image is larger than or equal to a preset matching degree threshold, that the TouchDown event exists, wherein the reference image is formed with the reference parameters of the N sampling points, and N is a positive integer.

* * * * *